United States Patent [19]
Höglund et al.

[11] Patent Number: 6,116,576
[45] Date of Patent: Sep. 12, 2000

[54] MEMBRANE VALVE WITH STRUCTURE FOR ASSURING A TIGHT SEAL IN THE CLOSED POSITION

[75] Inventors: Kasper Höglund, Rönninge; Göran Rydin, Täby, both of Sweden

[73] Assignee: Siemens-Elema AB, Solna, Sweden

[21] Appl. No.: 09/331,463

[22] PCT Filed: Nov. 28, 1997

[86] PCT No.: PCT/SE97/01976

§ 371 Date: Jun. 18, 1999

§ 102(e) Date: Jun. 18, 1999

[87] PCT Pub. No.: WO98/28561

PCT Pub. Date: Jul. 2, 1998

[30] Foreign Application Priority Data

Dec. 20, 1996 [SE] Sweden .................................. 9604725

[51] Int. Cl.[7] .................................................... A62B 9/02
[52] U.S. Cl. ...................... 251/331; 251/337; 251/129.17
[58] Field of Search .................................. 251/331, 337, 251/129.17; 128/205.24

[56] References Cited

U.S. PATENT DOCUMENTS

| | | | |
|---|---|---|---|
| 4,805,871 | 2/1989 | Nakamura | 251/129.17 |
| 4,915,353 | 4/1990 | Danko . | |
| 4,988,074 | 1/1991 | Najmolhoda | 251/129.15 |
| 5,186,434 | 2/1993 | Nishimura et al. | 251/331 |
| 5,265,594 | 11/1993 | Olsson et al. . | |

FOREIGN PATENT DOCUMENTS

| | | |
|---|---|---|
| OS 1 400 589 | 10/1968 | Germany . |
| OS 195 25 089 | 1/1997 | Germany . |

*Primary Examiner*—Kevin Shaver
*Assistant Examiner*—Eric Keasel
*Attorney, Agent, or Firm*—Hill & Simpson

[57] ABSTRACT

A valve for regulating a flow of gas, has a valve body with an inlet for the gas to be regulated, an outlet for a regulated flow of a gas, a valve seat with a valve opening, a moving closure part having a tensioned membrane mounted inside the valve body and a plunger, which is movable by a plunger actuator, whose end acts on the membrane, causing the closure part to close and open the valve opening and regulate the flow of gas through same. The flow of gas can be simply and inexpensively regulated, with great accuracy and repeatability and which forms a hermetic seal when the valve is in the closed position, a rigid, flat plate is be arranged opposite the valve seat the plate having a surface area which is at least equal to the surface area of the valve seat. The plate is arranged so that it follows the axial movements of the membrane and can be tilted in relation to the plunger's longitudinal axis, and the part of the plunger end acting on the membrane has a surface area smaller than the surface area of the valve seat.

9 Claims, 3 Drawing Sheets

ND: 6,116,576

MEMBRANE VALVE WITH STRUCTURE FOR ASSURING A TIGHT SEAL IN THE CLOSED POSITION

BACKGROUND OF THE INVENTION

1. Field of the Invention

The present invention relates to a valve for regulating a flow of gas, of the type have a valve body with an inlet for the gas to be regulated and an outlet for a regulated flow of a fluid, a valve seat with a valve opening, a moving closure part having a tensioned membrane mounted inside the valve body and a plunger, which is movable by an actuator arrangement, whose end acts on the membrane, causing the closure part to close and open the valve opening and regulate the flow of gas through same.

2. Description of the Prior Art

A valve of the above general type is shown and described in U.S. Pat. No. 5,265,594. It is highly important, particularly in the supply of gas to a patient on a ventilator, to ensure that the amount of gas supplied through such a valve is regulated with great accuracy and repeatability. In order to achieve this, the membrane must lift off the valve seat, parallel to same, every time the valve opens. When the membrane is closed with by the end of the plunger, which is flat with a surface area somewhat larger than the surface area of the valve seat, the end of the plunger must press against the valve seat with an evenly applied force. This can sometimes be difficult to achieve, since the valve seat and plunger are not always perfectly aligned. If their positions are disturbed so e.g. the plunger tilts in relation to the valve seat, this tilted, often uncontrolled, plunger position can result in leakage between the membrane and valve seat and to impaired regulation of gas flow through the valve. Even small angular deviations can greatly impair regulation of the flow of gas.

SUMMARY OF THE INVENTION

It is an object of the invention is to provide a valve of the type initially described where in a flow of gas can be regulated, using simple and, accordingly, inexpensive means, with great accuracy and repeatability and which forms a hermetic seal when in the closed position.

The above object is achieved in accordance with the present invention in a valve having a rigid, flat plate, arranged opposite the valve seat, said plate having a surface area which is at least equal to the surface area of the valve seat, the plate being arranged in such a way that it follows the membrane's axial movements and can be tilted in relation to the plunger's longitudinal axis. The part of the plunger end acting on the membrane has a surface area which is smaller than the surface area of the valve seat. As a result of the surface area of the part of the plunger end acting on the membrane and on the plate respectively, the rigid plate is able to tilt towards the plunger when the valve opening is opened or closed respectively, thereby compensating for any misalignment of the plunger or valve seat, and controlled, repeatable membrane movement is accordingly achieved. The end of the plunger, according to the invention, can advantageously be convex.

According to one advantageous embodiment of the valve according to the invention, the plate is part of the membrane. The plate can be advantageously integrated into the membrane or also glued onto it.

According to an additional embodiment of the valve according to the invention, the plate is part of a spiral-shaped washer which presses firmly against the membrane, said washer being mounted inside the valve body. As a result, the washer and, accordingly, the plate are a separate part which can be replaced when needed without any need to replace the membrane as well.

According to the invention, the plate can also be part of leaf spring which presses firmly against the membrane, said leaf spring being mounted inside the valve body. Here, the plate can also be replaced when needed.

The spiral-shaped washer and leaf spring can be advantageously arranged on the side of the membrane facing away from the valve seat.

According to the invention, the plate can be made of metal, preferably spring steel, about 0.15 mm thick.

DESCRIPTION OF THE PREFERRED EMBODIMENTS

Figure 1:
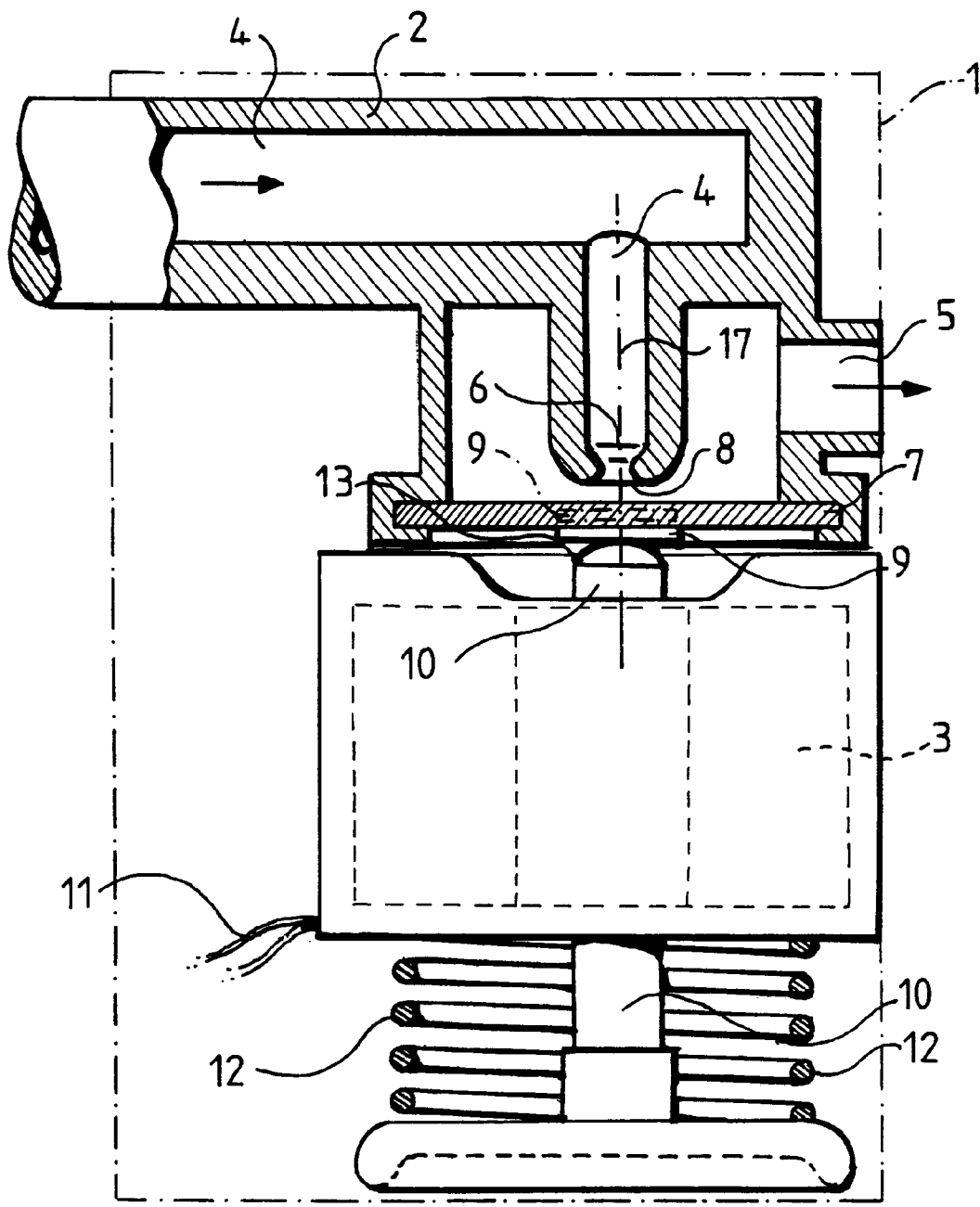
FIG. 1 is a schematic illustration, partly in section, of a valve with a closure part constructed in accordance with the principles of the present invention, in an open position.

FIG. 1 shows, partially in cross-section, one embodiment of a valve, according to the invention, shown here in an open position. The valve has a valve hood 1, in which a valve body 2 is removably arranged, and a solenoid 3 permanently attached to the valve hood 1. The valve body 2 is provided with a through channel to pass the flow of a gas to be regulated, said channel being subdivided into an inlet 4, an outlet 5 and a valve opening 6 between same. A tensioned membrane 7, which is mounted inside the valve body 2 and which serves to regulate the flow of fluid, e.g. a gas, to a patient when the patient is on a respirator (not shown) is arranged opposite the valve opening 6. A rigid, flat plate 9 is attached to the side of the membrane 7 facing away from the valve seat 8 of the valve opening 6. The surface area of the plate 9 is somewhat larger than the surface area of the valve seat 8. In FIG. 1, the end 13 of the plunger 10 of the solenoid 3 presses against the plate 9, said plunger end 13 being advantageously convex.

Figure 2:
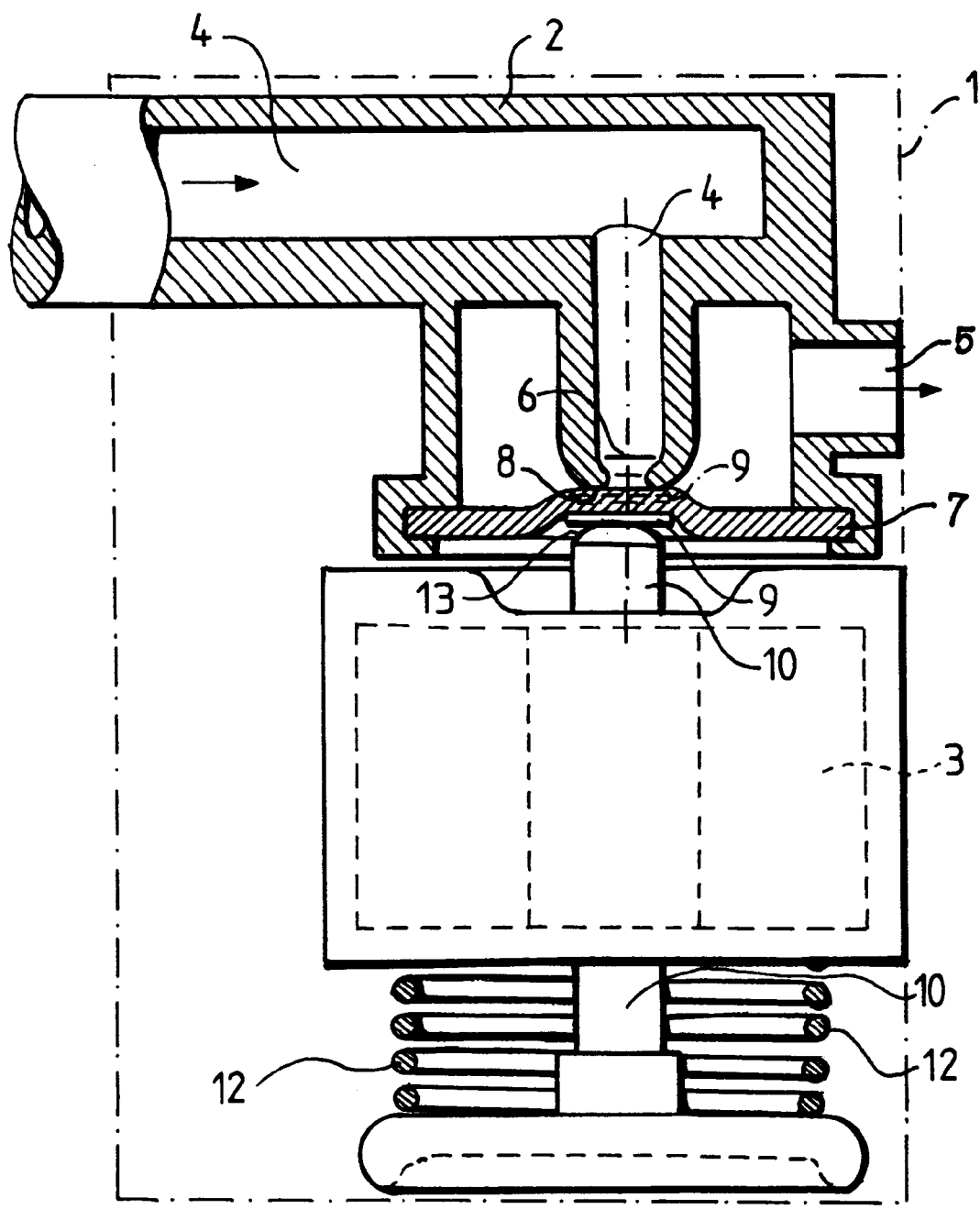
FIG. 2 shows the valve of FIG. 1 with the closure part in a closed position.

In order to achieve an open valve position, as shown in FIG. 1, larger or smaller amounts of current are applied to the solenoid 3 across the cable 11, causing the plunger 10 to retract into the solenoid body, i.e. downwardly in FIG. 1, whereupon the membrane 7, due to the membrane material's elasticity and the force of the application pressure, can be made to lift off the valve seat 8 in the desired manner, enabling gas to flow through the valve opening 6 via the outlet 5 and on to the patient. When current to the solenoid 3 is turned off, power to the solenoid plunger 10 is also turned off, whereupon the plunger 10, through the action of pressure springs 12, presses the rigid plate 9 and, accordingly, the membrane 7 against the valve seat 8 with sufficient force to shut the valve opening 6, as shown in FIG. 2. This therefore achieves a desirable safety feature, viz. valve shutdown in the event of a power failure, thereby preventing an uncontrolled flow of gas to the patient. Accurate and repeatable membrane movement, i.e. flow regulation and closure of the valve opening, is achieved without difficulty, as a rule, when the plunger's 10 longitudinal axis is aligned with the fictitious longitudinal axis of the part of the inlet channel 4 which opens onto the valve opening 6, as illustrated with the dash-dotted line 17 in FIG. 2.

If the solenoid 3 and, accordingly, the plunger 10 have been displaced out of position and shifted position, in relation to the valve seat 8 and the membrane 7, and the membrane 7 is to lift off the valve seat 8, the membrane 7 always tips, with the aid of the plate 9 and the membrane's own elastic force, towards the convex end of the plunger 13 to a position in which the membrane during opening is parallel to the valve seat 8. When, during closure of the valve opening 6, the membrane 7 is pressed in the described manner by the plunger 10 towards the valve seat 8, this is accomplished when the plate 9 and the membrane 7 tip towards the plunger end 13 in such a way that the membrane 7 always remains parallel to the valve seat 8. When the valve is in the closed position, the membrane 7 therefore presses with an evenly applied force against the valve seat 8. In the same way as described above, accurate and repeatable membrane movement and optimal closure of the valve opening 6 are always achieved, even when the valve seat 8 and the plunger 10 are misaligned.

The same advantageous effects cited in conjunction with the descriptions of FIGS. 1 and 2 are achieved when the plate 9 is integrated into the membrane, as shown with dash-dotted outlines in FIGS. 1 and 2. The plate 9 is advantageously made of spring steel with an approximate thickness of 0.15 mm. The plate can naturally be made of some other suitable material.

Figure 3:
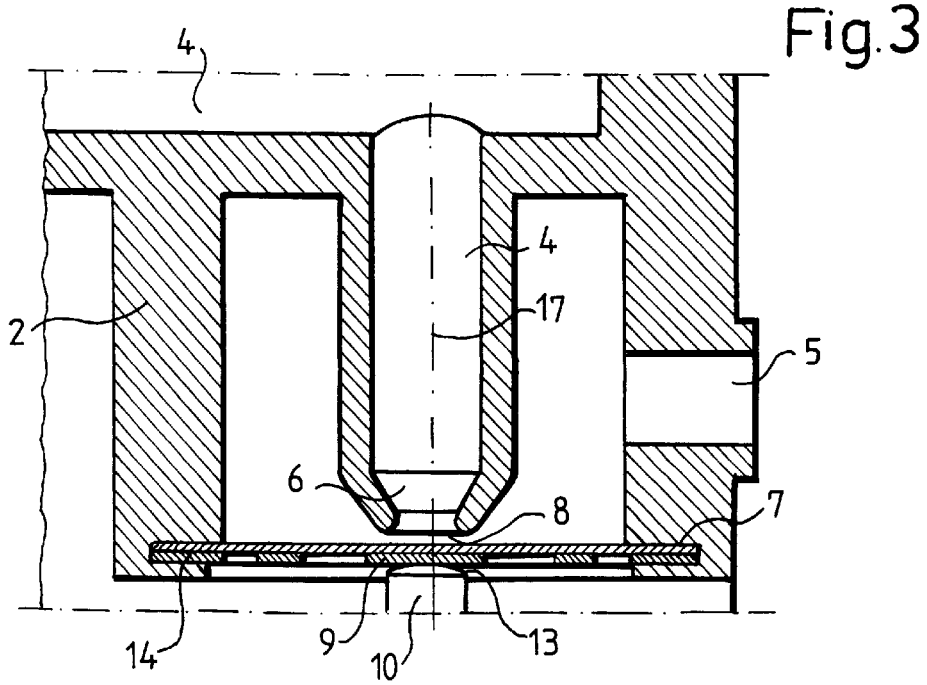
FIG. 3 is a sectional view of portion of the valve of FIGS. 1 and 2, showing a further embodiment of the closure section in accordance with the invention.

FIG. 3 shows that the plate 9 can be a part of a spiral-shaped washer 14 which presses firmly against the side of the membrane 7 facing away from the valve seat 8. The washer 14, like the membrane 7, is mounted inside the valve body 2.

Figure 4:
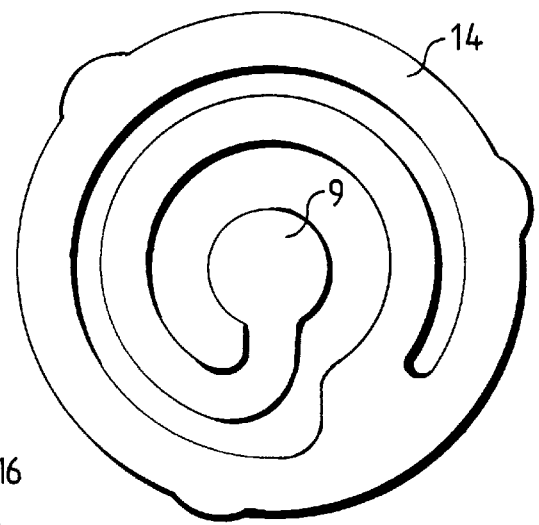
FIG. 4 is a plan view of the closure part in the embodiment of FIG. 3.
Figure 5:
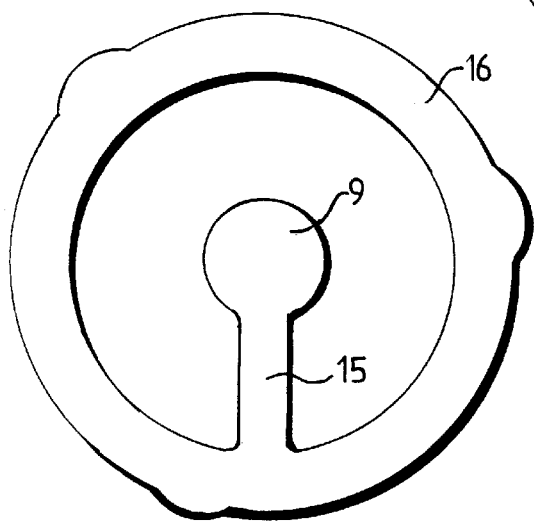
FIG. 5 is a plan view of another embodiment of a closure part for use in the inventive valve.

FIG. 4 shows the washer. FIG. 5 shows that the plate 9 can also be part of a leaf spring 15. The plate 9 and leaf spring 15 can be advantageously punched out of a washer so the washer can be mounted more firmly inside the valve body 2.

In one embodiment within the scope of the invention, the plate 9 can be attached by a hinge to the end 13 of the plunger. In another embodiment, the washer 14 and the leaf spring 15 can be arranged between the membrane 7 and the valve seat 8. In yet another embodiment, the plate 9 can be glued to the side of the membrane 7 facing the valve seat 8. In the latter two instances, either the plate 9 or the valve seat 8 is provided with a soft coating which forms a seal when the valve is in the closed position. In this embodiment, the membrane only serves to prevent the egress of gas which would otherwise flow out into ambient air.

Although modifications and changes may be suggested by those skilled in the art, it is the intention of the inventors to embody within the patent warranted hereon all changes and modifications as reasonably and properly come within the scope of their contribution to the art.

What is claimed is:

1. A valve for regulating a flow of gas, comprising:
a valve body with an inlet for gas to be regulated and an outlet for a regulated flow of gas, a valve seat in said valve body, having a surface area and a valve opening, a moving closure part comprising a tensioned membrane mounted inside the valve body, a plunger having a longitudinal axis and a plunger end, a plunger actuator to move said plunger to cause a part of said plunger end to act on the membrane, causing the closure part to close and open the valve opening and regulate the flow of gas through said valve opening, a rigid, flat plate disposed opposite the valve seat, said plate having a surface area which is at least equal to the surface area of the valve seat, the plate following axial movements of the membrane and being tiltable in relation to the longitudinal axis of the plunger, and the part of the plunger end which acts on the membrane having a surface area which is smaller than the surface area of the valve seat.

2. The valve according to claim 1, wherein the end of the plunger is convex.

3. The valve according to claim 1 wherein the plate is part of the membrane.

4. The valve according to claim 1 further comprising a spiral-shaped washer and wherein the plate is a part of said spiral-shaped washer which presses firmly against the membrane, said washer being mounted inside the valve body.

5. The valve according to claim 4 wherein said spiral-shaped washer is disposed on a side of the membrane facing away from the valve seat.

6. The valve according to claim 1 further comprising a leaf spring and wherein the plate is a part of said leaf spring which presses firmly against the membrane, said leaf spring being mounted inside the valve body.

7. The valve according to claim 6, wherein the leaf spring is disposed on a side of the membrane facing away from the valve seat.

8. The valve according to claim 1 wherein the plate is composed of metal.

9. The valve according to claim 8 wherein said plate is comprised of spring steel.

* * * * *